(12) United States Patent
Neill

(10) Patent No.: US 6,411,338 B1
(45) Date of Patent: Jun. 25, 2002

(54) PRODUCING A SERIES OF IMAGES FOR DISPLAY ON A DISPLAY DEVICE

(75) Inventor: Michael J. Neill, Southampton (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/490,587

(22) Filed: Jan. 25, 2000

(30) Foreign Application Priority Data

Jan. 25, 1999 (GB) .............................................. 9901514

(51) Int. Cl.$^7$ .............................................. H04N 5/445
(52) U.S. Cl. ........................ 348/564; 348/569; 348/563
(58) Field of Search ................................ 348/567, 569, 348/564, 553, 563, 719, 715, 714, 716, 468; H04N 5/445, 5/44

(56) References Cited

U.S. PATENT DOCUMENTS

| 4,611,227 A | 9/1986 | Brockhurst et al. .......... 358/147 |
| 5,353,391 A | 10/1994 | Cohen et al. ............... 395/125 |
| 5,613,048 A | 3/1997 | Chen et al. .................. 395/119 |
| 5,636,340 A | 6/1997 | Bonneau et al. ............. 395/761 |

FOREIGN PATENT DOCUMENTS

| GB | 1493223 | 11/1977 |
| WO | 9702700 A2 | 1/1997 |

OTHER PUBLICATIONS

"Three Dimensional Distance Field Metamorphosis", by Daniel Cohen et al, ACM Transactions on Graphics, vol. 17, No. 2, Apr. 1998, pp. 116–141.

*Primary Examiner*—Sherrie Hsia
(74) *Attorney, Agent, or Firm*—Laurie Gathman

(57) ABSTRACT

A method for producing images for display by a television receiver wherein each image is in the form of a bitmap. Each of the bit mapped images is resolved into an array of dynamically redefinable characters (DRCs). Each of the DRCs forming the image to be displayed is stored in non-volatile memory. Under the control of the microprocessor, the array of DRCs for each image is copied from the non-volatile memory, into a display RAM, in order to create a bit mapped image and to display each of the bit mapped images in turn.

15 Claims, 11 Drawing Sheets

PRODUCING A SERIES OF IMAGES FOR DISPLAY ON A DISPLAY DEVICE

BACKGROUND OF THE INVENTION

The invention relates to a method of producing a series of images for display on a display device and to a display device which is arranged to display such a series of images. A particular, but not exclusive, application of the invention is in a television receiver.

A method and apparatus for transitioning between sequences of images is disclosed in U.S. Pat. No. 5,353,391. This patent discloses a method and apparatus for generating and viewing a transition between a first and second sequence of images on a computer controlled display system. The method of the invention involves several steps, including: providing a first and second sequence of digitized images, which are typically stored in the computer system; providing the duration of total time of the transition between the first and second sequence of images; providing a resource means for specifying the transition between the first and second sequence; determining a first portion of the first sequence of images (the first portion having a duration in time less than or equal to the duration of the transition); determining a second portion of the second sequence (the second portion of the second sequence of images having a duration in time less than or equal to the duration of the transition); creating a transition template from the transition resource, the transition template having a duration equal to the transition; and combining the first portion of the first sequence and the second portion of the second sequence with the transition template to thereby produce a third sequence of images. The step of creating a transition template from the transition resource is further comprised of the steps of selecting objects, interpolating objects and/or a source image area and mapping objects to a source image area. In the combining step, the transition template is used to determine which portions of the first source sequence, the second source sequence, or both will be displayed in the third sequence of images. Also provided is a means for modifying a duration of the entire transition or for modifying a duration of individual frames within the transition.

This method and apparatus involves the use of a personal computer which includes extensive memory and a relatively expensive microprocessor.

Television receivers are known which use a microprocessor to control the operation of the various circuits of the receiver and which produce on screen displays to enable the user to access various features. Such receivers may also include data capture circuits which are used to obtain services such as teletext which displays broadcast text messages on the screen. Such receivers will have a character generator which contains a plurality of sets of characters in the form of bit maps of a particular character. Thus each character may for example occupy an array of 16×12 pixels. The teletext data as transmitted will address particular characters in the character generator to cause them to be displayed on the screen at the appropriate location. These character sets can also be used for on screen display under the control of the microprocessor. It is sometimes desired to have special characters which do not form part of one of the standard character sets that are stored in the character generator. These special characters may be stored in memory associated with the microprocessor or may be generated by the microprocessor itself and are known as dynamically redefinable characters in that the microprocessor can redefine these characters during a sequence of steps. Thus the character generator may include a portion of random access memory into which the microprocessor may write these redefinable characters. These characters may then be displayed on the screen using the normal processes of the character generator.

BRIEF SUMMARY OF THE INVENTION

It is an object of the invention to enable the provision of a method of producing a series of images for display on a display device using an inexpensive micro processor such as a typical television microprocessor and using quantities of memory which are associated with consumer apparatus. That is to enable the use of a comparatively inexpensive microprocessor and a relatively small amount of memory.

The invention provides a method of producing a series of images for display on a display device using a microprocessor having a non-volatile memory and a display RAM comprising the steps of:-
  a) providing each image in the form of a bit map,
  b) resolving each of the bit mapped images into an n×m array of dynamically redefinable characters (DRC) of a×b pixels, where a, b, m, and n are integers,
  c) storing each of the DRCs forming each of the images in the non volatile memory,
  d) copying under the control of the microprocessor the array of DRCs for each image in turn from the non volatile memory into a display RAM to create a bit mapped image, and
  e) displaying in turn each of the bit mapped images.

The method according to the invention depends on the realisation that if there is a possibility of having dynamically redefinable characters displayed on a screen and that there are enough of these characters to form an array into which an image may be inserted, then this enables the user of a comparatively inexpensive microprocessor to select the dynamically redefinable characters for display and to write them into a display RAM to create what is effectively a bit map image made up of an array of dynamically redefinable characters. Thus if a sequence of such images is stored in the form of a sequence of arrays of dynamically redefinable characters in a non-volatile or a read only memory the microprocessor can collect these arrays of redefinable characters and transfer them at the appropriate time to the display memory to enable a sequence of images to be displayed. The process of converting the images in the form of bit maps to an array of dynamically redefinable characters is not carried out by the microprocessor in the display device but is rather carried out using a personal computer or work station to create data files which consist of the dynamically redefinable characters for each image. These are then written into the non volatile memory either at the time of manufacture in the case of a read only memory or in the case of a non volatile read/write memory may be entered into the memory at a later date. It is possible that such images could be transmitted via a teletext channel when the display device forms part of a television receiver if a read/write non-volatile memory was provided. Thus any data channel which transmits data which can be captured by a data capture circuit within the television receiver could transfer such sequence of images into the non-volatile memory.

DRCs that are unchanged between successive images may be stored only once in the non-volatile memory. Thus it is not necessary to store the whole of each of the successive images but instead only those DRCs which contain changed information need to be stored. This gives a reduction in the size of the non volatile memory required to store most sequences.

Each image may be contained in an array of up to twenty five dynamically redefinable characters. This number is not an absolute limit, but represents a reasonable allocation of display memory for a consumer device. It would of course be possible to provide larger arrays for a higher end television receiver which offers a greater number of features and commands a premium price which can justify the cost of additional memory.

A first image may be transformed to a second image by gradually distorting the first image so as to move chosen points on the first image to the position of corresponding points on the second image. Such a process has been referred to by the term "morphing" and may be used to dissolve one image into another.

The method may comprise the steps of:

f) creating a first list of positions of pixels of a given colour in the first image, g) creating a second list of positions of pixels of the given colour in the second image, h) mapping each pixel in the first list to its closest partner in the second list, i) mapping each remaining pixel in the second list to its closest partner in the first list, j) calculating the position of each pixel in intermediate images between the first and second images to create intermediate lists of positions of pixels, k) converting each of the lists created in step j) into a bitmap image, l) resolving each of the images produced in step k) into an array of DRCs, m) storing the DRCs of each image in the non-volatile memory, and n) carrying out steps d) and e).

This procedure would normally be carried out using a personal computer or work station to generate a data file of successive images which can then be copied to the non-volatile memory of the television receiver. This could be at the time of manufacture as with a mask programmed read only memory formed on the same chip as the microprocessor or could be in additional memory which could be replaceable or re-programmable to enable new sequences to be produced either instead of or in addition to the original sequences.

Steps c) and d) may be carried out using Pythagoras' theorem to calculate the positions in the x and y dimensions. Step e) may be carried out by dividing the change in x and y directions by the number of intervening images to produce the intermediate positions for each pixel. Thus if for example there are eight intervening frames between the first image and the second image the distance between the pixels in the first and second images is divided by eight to produce the intermediate positions in each of the intervening frames.

The invention further provides a display device comprising a microprocessor having a non-volatile memory associated therewith, a display arrangement for displaying on screen display text and/or graphics generated by said microprocessor, said display arrangement including a memory for storing a standard set or sets of characters, a portion of memory for storing dynamically redefinable characters (DRCs), and means for displaying selected characters from said standard set or sets or from said DRCs, wherein the non-volatile memory contains a series of images each of which is resolved into an array of DRCs, and the microprocessor is arranged to transfer each of the images in turn into said portion of memory in the display arrangement in order to display a selected sequence of images.

Such a display device is arranged to carry out the method of the invention and is capable of displaying animated images or of morphing between two images. This has particular application in television receivers incorporating such a display device and gives an enhanced on screen display capability enabling manufacturers to provide more attractive on screen displays for their products, perhaps involving cartoon characters or other logos having given animation effects and of providing an attractive transition from one title to another. Thus by using this technique a television manufacturer can differentiate its products from those of other manufacturers.

BRIEF DESCRIPTION OF THE DRAWINGS

The above and other features and advantages of the invention will be apparent from the following description, by way of example, of embodiments of the invention with reference to the accompanying drawings, in which.

DETAILED DESCRIPTION OF THE INVENTION

Figure 1:
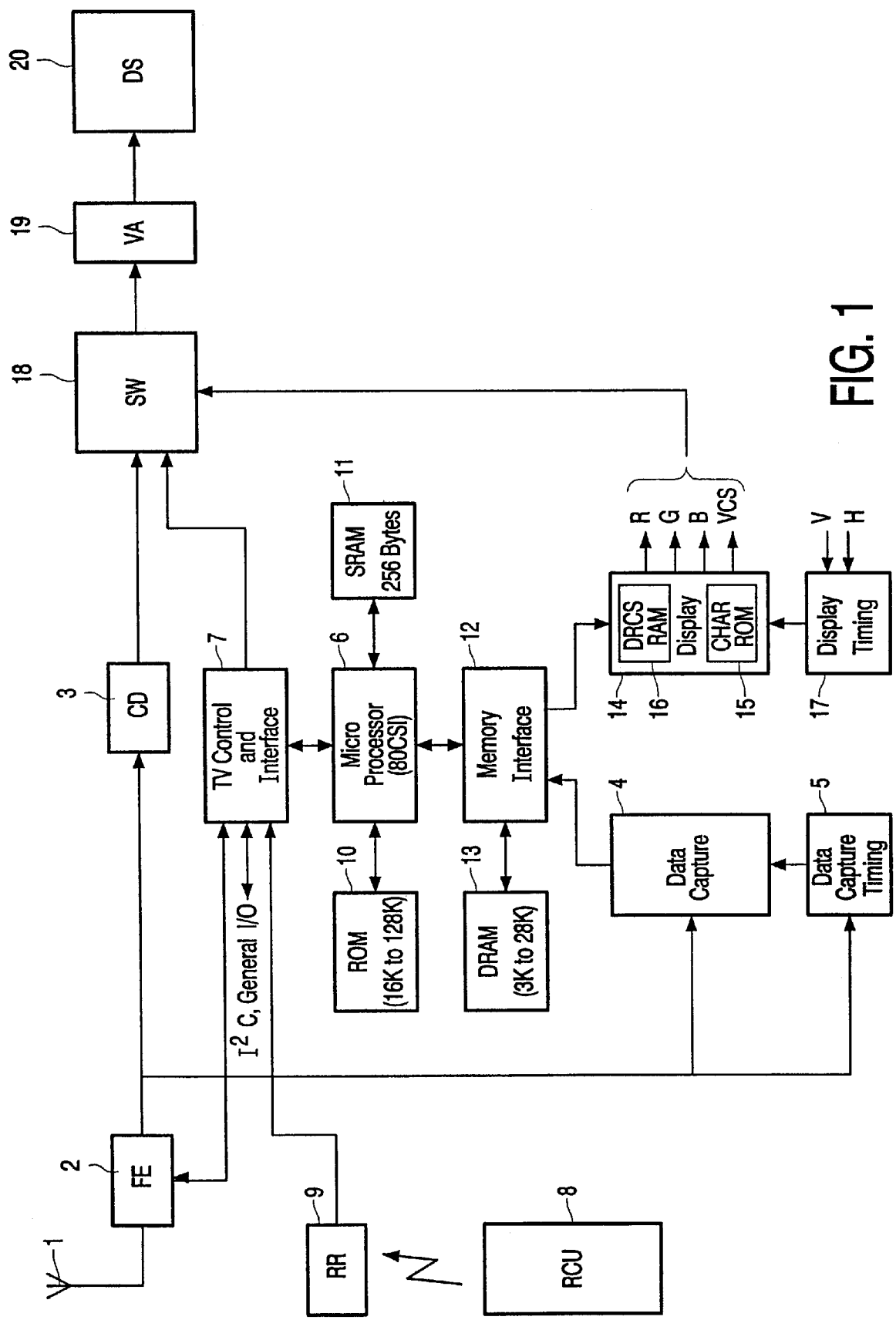
FIG. 1 shows in block schematic form a television receiver according to the invention which is capable of carrying out the display method of the invention.

FIG. 1 shows in block schematic form a television receiver for carrying out the display method of the invention. As shown in FIG. 1 the receiver comprises an aerial 1 connected to the input of a front end 2 which contains the usual tuning, i.f. and demodulation circuits. The output of the front end 2 in the form of a combined video and blanking signal (CVBS) is fed to the inputs of a colour decoder 3, of a data capture circuit 4, and of a timing circuit 5 for the data capture circuit 4. A microprocessor 6 is connected through a control interface 7 to various portions of the television receiver, such as the front end 2, to provide control signals to control the operation of the television receiver. A remote control unit 8 transmits user commands to a receiver 9 which is connected to the microprocessor 6 through the control interface 7.

The microprocessor is provided with a read only memory ROM 10 and a random access memory RAM 11. The ROM 10 is a program memory and also contains frames for animation and morphing as will be described hereinafter. The microprocessor 6 further communicates via a memory interface 12 with a RAM 13 and display circuit 14. The display circuit 14 includes a character ROM 15 and a portion of RAM 16 which is capable of storing a number of Dynamically Redefinable characters (DRCs). In this particular example the RAM 16 will hold a maximum of thirty two characters but this is not essential and the size of the RAM 16 may be chosen to hold a greater or lesser number of such characters depending on the size of memory which is provided. The display circuit 14 also receives timing pulses from a timing circuit 17 which generates the timing signals from vertical and horizontal synchronising signals V and H.

The output of the display circuit 14 is in RGB form and is fed to a first input of a switching arrangement 18 whose output is fed via video amplifiers 19 to a display device 20. The switching arrangement 18 has a second input which receives a video signal from the colour decoder 3 and a control input which receives a signal from the microprocessor 6 via the control interface 7 so that either a text or graphics display from the display circuit 14 or a received video signal or a combination of both can be selected for display.

The character ROM 15 contains predefined character sets which define characters which can be selected for display. Such character sets may for example be arranged to display teletext transmissions. The display generator 14 also contains a portion of RAM 16 which is arranged to store a number of redefinable characters (in this example up to thirty two). These characters (DRCs) can be redefined within the operation of a program executing on the microprocessor 6. This is achieved by copying a new set of characters from the ROM 10 to the RAM 16. To conform with the characters in the character ROM 15 each DRC must be twelve pixels in width and can be ten, thirteen, or sixteen pixels in height. These dimensions have been chosen as appropriate for displaying alpha numeric characters for teletext display but other size arrays would be possible depending on the resolution required.

It has been realised that a picture or a larger character or series of characters can be displayed using a plurality of such DRCs. That is a picture can be resolved into an array of DRCs and can be displayed by displaying some or all the DRCs of the array simultaneously. Since each of the DRCs can be redefined a new set of DRCs can be defined to form an array containing different data to display another picture. Thus by generating a series of sets of DRCs corresponding to a series of pictures and storing them in the ROM 10 the microprocessor 6 can use them by transferring them in sequence to the RAM 16 and consequently cause the display circuit 14 to produce a sequence of pictures on the display device 20.

Figure 2:
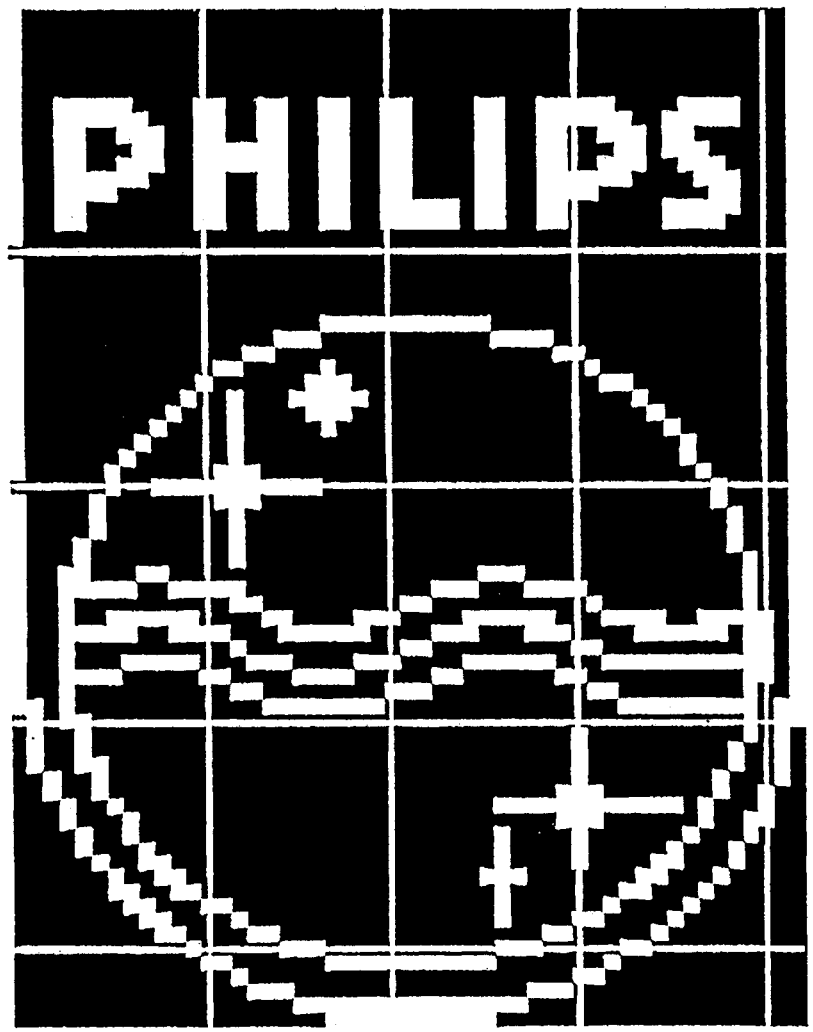
FIG. 2 shows a bit map image resolved into an array of dynamically redefinable characters.
Figure 3:
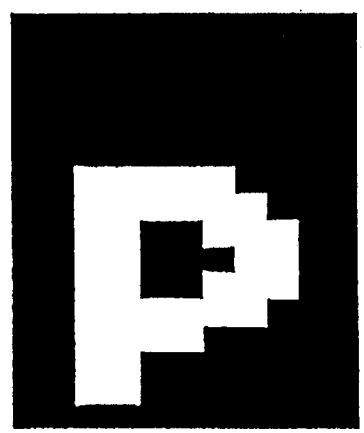
FIG. 3 shows a bit map dynamically redefinable character.
Figure 4:
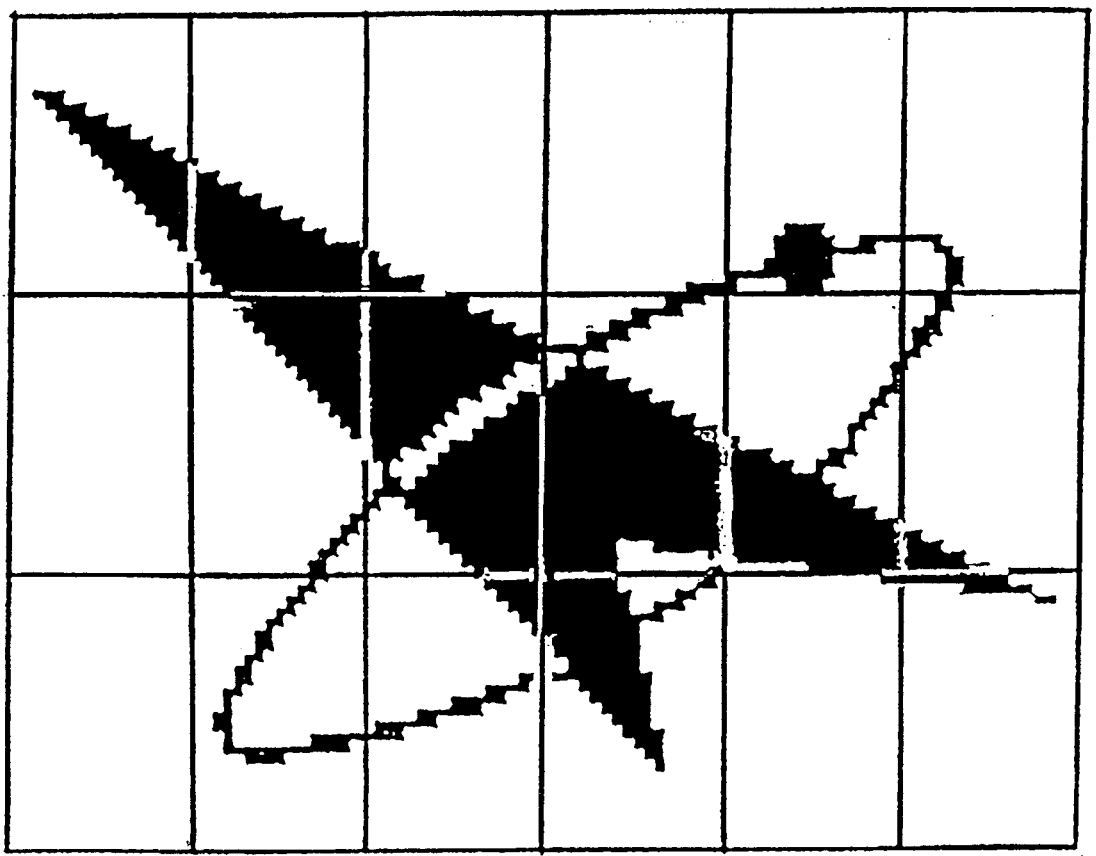
FIG. 4 shows a further image of an object resolved into an array of dynamically redefinable characters.

FIGS. 2 and 3 illustrate how a bit mapped picture (FIG. 2) is resolved into a plurality of smaller sized bit maps of a size in pixels which corresponds to the size of a selected DRC. For example a bit map of dimensions 50×72 may be resolved into twenty five DRCs of dimensions 12×16 pixels. This is shown by the white lines in FIG. 2. FIG. 3 shows a bit map corresponding to an individual dynamically redefinable character, in this case the first character of the first row of the array.

Having realised the possibility of using the DRCs to assemble pictures it now becomes possible to animate and morph images. In order to perform animation a series of frames has to be displayed on the display screen 20. This is achieved by converting each frame into an array of DRCs and storing the successive frames in the ROM 10. These are then read out in sequence by the microprocessor 6 and transferred to the RAM 16. Subsequently the array of DRCs in the RAM 16 is displayed conventionally. During the next vertical blanking interval the DRCs corresponding to the next displayed frame are copied from the ROM 10 to the RAM16 and subsequently displayed. The length of any animated sequence will depend on the number of frames which are stored in the ROM10 and whether these frames form a loop i.e. the last frame in the sequence is followed by the first frame to repeat the sequence indefinitely or alternatively the sequence is reversed when it reaches the last stored frame.

Figure 5:
FIGS. 5 to 8 show successive images of the object of FIG. 4 which are modified in order to provide an animation.
Figure 6:
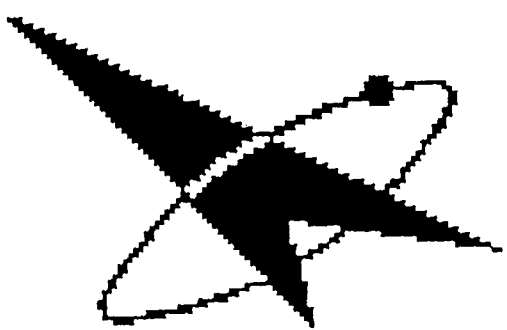
Figure 7:
Figure 8:

An example of animation will now be described with reference to FIGS. 4 to 8 of the accompanying drawings. As can be seen from FIG. 4 the logo to be animated has been resolved into an array of three by six DRCs. These DRCs are stored in the ROM 10. As can be seen from FIGS. 5 to 8 the sphere S is travelling around an orbit O. Thus FIG. 5 shows the position of the sphere in frame 1, FIG. 6 its position in frame 2, FIG. 7 its position in Frame 3, and FIG. 8 its position in frame 4. Clearly a sequence of more than four frames is required to cause the sphere to complete a full revolution of the orbit in the example shown. The number of images displayed for such a complete orbit will determine the speed and apparent smoothness of the motion. A continuous orbiting of the sphere may be produced by looping the last frame of the sequence back to the first. It will be apparent that the only DRCs which change between frames are those which the sphere has left and those which the sphere has entered, or alternatively the one in which the sphere has changed position if it has not changed DRC area. In this case in order to improve efficiency and reduce the number of DRCs to be stored and copied only those DRCs which change from frame to frame are stored in the ROM 10 and copied to the RAM 16. This procedure does, however, have the result that the bitmap cannot change in size during the animation. This does not, of course, apply if all the DRCs are charged from frame to frame where even if the size of the array is held constant some of the characters can be made completely transparent.

Figure 9A:
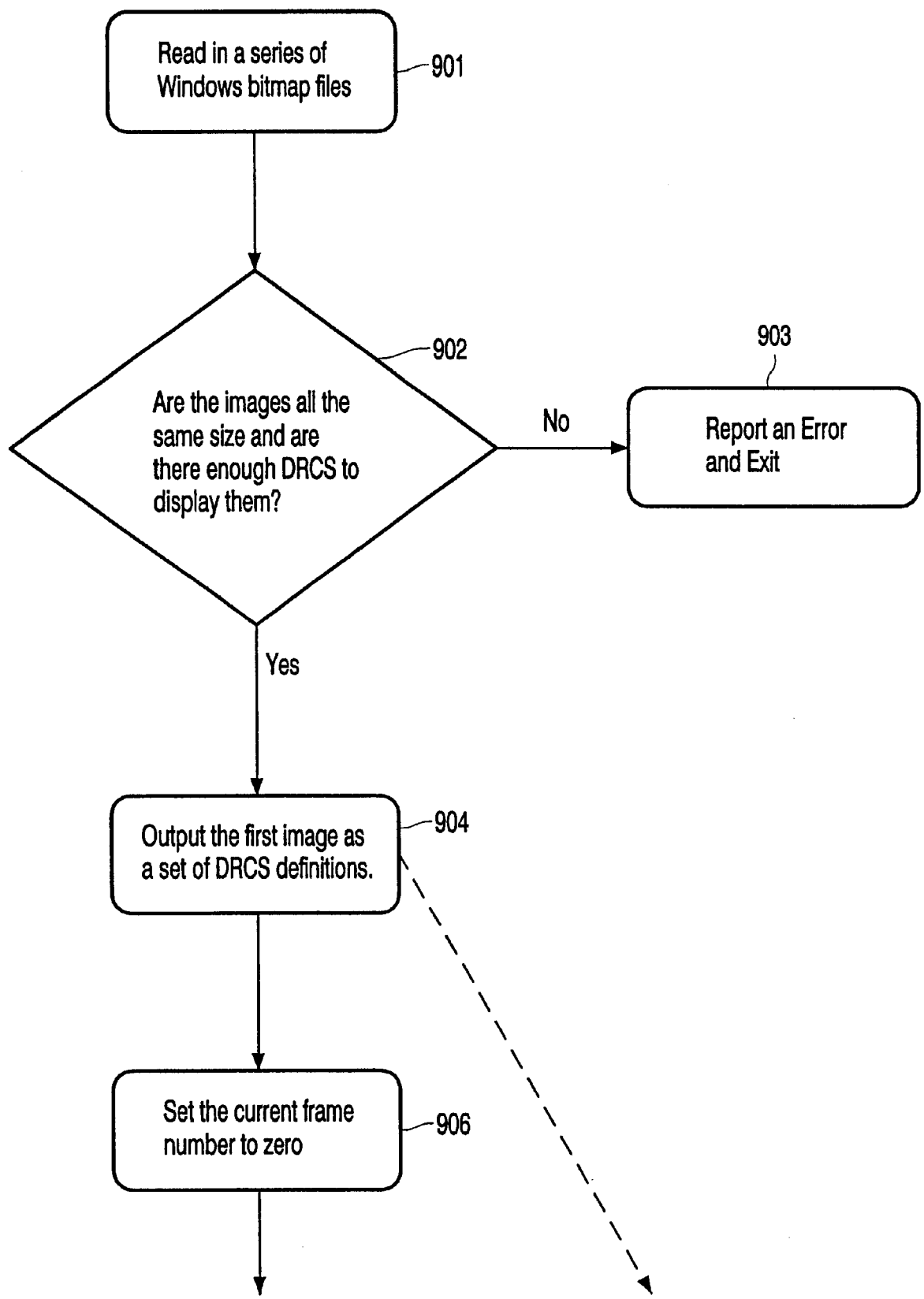
FIGS. 9a and 9b are flow diagrams illustrating the process of generating the data for enabling animated objects to be displayed.
Figure 9B:
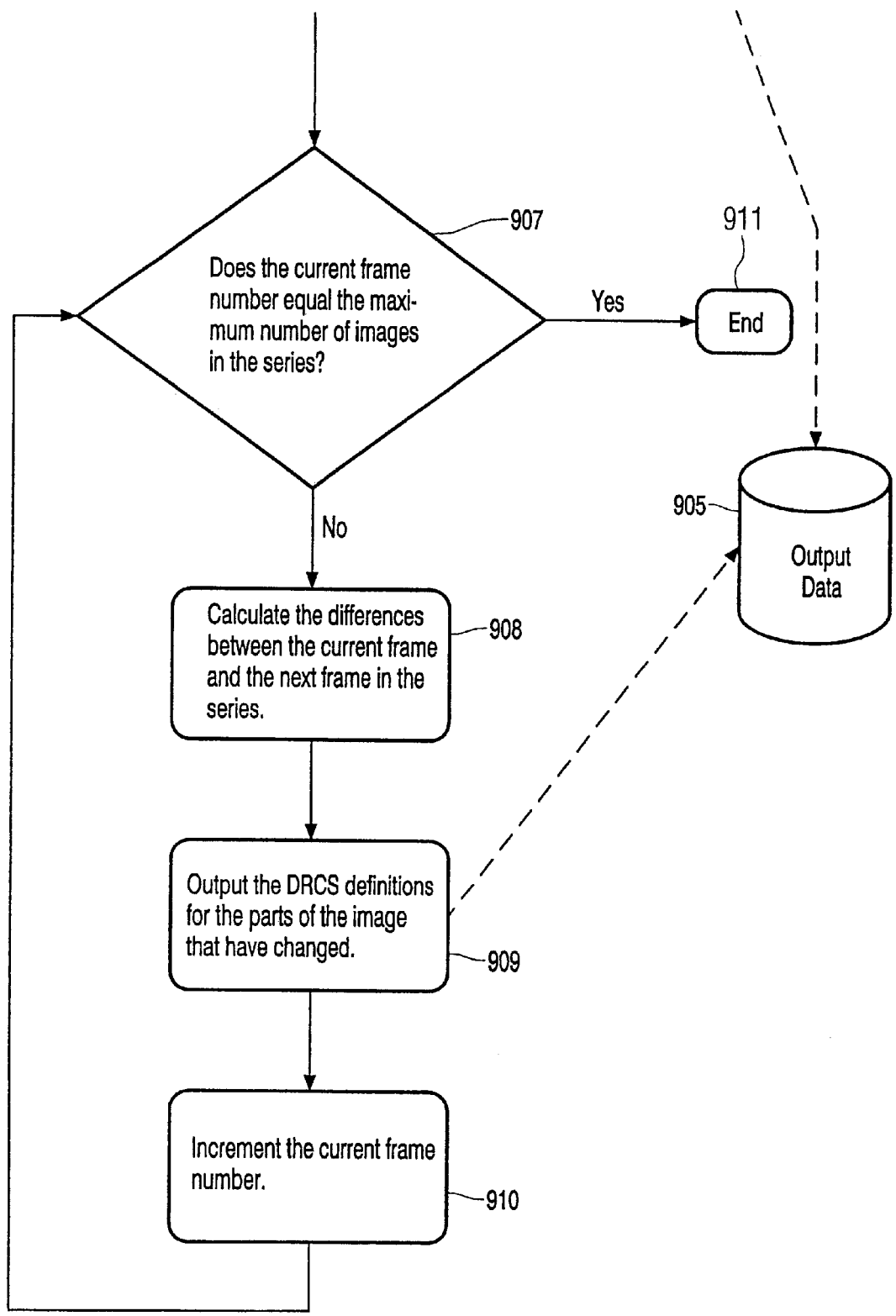

FIGS. 9a and 9b are flow diagrams illustrating the process of generating the set of images for animation. The process is not carried out in real time within the microprocessor 6 but instead the process is carried out using a personal computer or workstation to create the data in DRC format for storage in the ROM 10.

The process starts, as represented by block 901, with reading into the personal computer a series of bit map images which correspond to the animated series. A check is then made, block 902, as to whether the images are all the same size and that there are enough DRCs to display them. That is, that the image size is such that it will fit into an array of thirty two or fewer characters of size twelve pixels in width by ten, thirteen or sixteen pixels in height. If these conditions do not apply then an error is reported and the process ends, as represented by block 903. If, however, these conditions are met then the first image is resolved into an array of DRCs and is output as a set of DRC definitions, as represented by block 904, to a data file 905. The next step is to set the current frame number to zero, as represented by block 906. A decision is then made, block 907, as to whether the current frame number is equal to the maximum number of images in the sequence and, if not, the next step is to calculate the difference between the current frame and the next frame in the series, as represented by block 908. The DRC definitions of the parts of the image which have changed are then determined and output to the data file 905. This is represented by block 909. The current frame number is then incremented block 910 and the result applied to a decision step 907 which determines whether the current frame number is equal to the maximum number of images in the series and if so then the process ends, block 911. If the current frame number is less than the maximum number of images then steps 908 to 910 are repeated until the maximum number is reached.

The results of this process is a data file which contains DRC definitions for the array for each of the frames in the sequence. This data is then written into the ROM 10 during manufacture so that the sequence is displayable when the microprocessor 6, ROM 10 and display circuit 14 are incorporated into a television receiver such as that illustrated in FIG. 1.

A similar procedure can be used for "morphing", which can be described as the transformation of one image into another by gradually distorting the first image so as to move certain chosen points to the position of corresponding points in the second image.

In order to achieve the effect of morphing the first image is replaced on the display screen by successive images in a time sequential manner until the final image is reached. By successively reading stored DRCs from the ROM 10 and displaying them sequentially on the display screen the effect of morphing from the first image to the final image is achieved. This is illustrated in FIGS. 10a and 10b where the first image "PHILIPS" is morphed to the second image "MARANTZ" with eight intervening frames.

The morphing process is carried out as follows.

Figure 11:
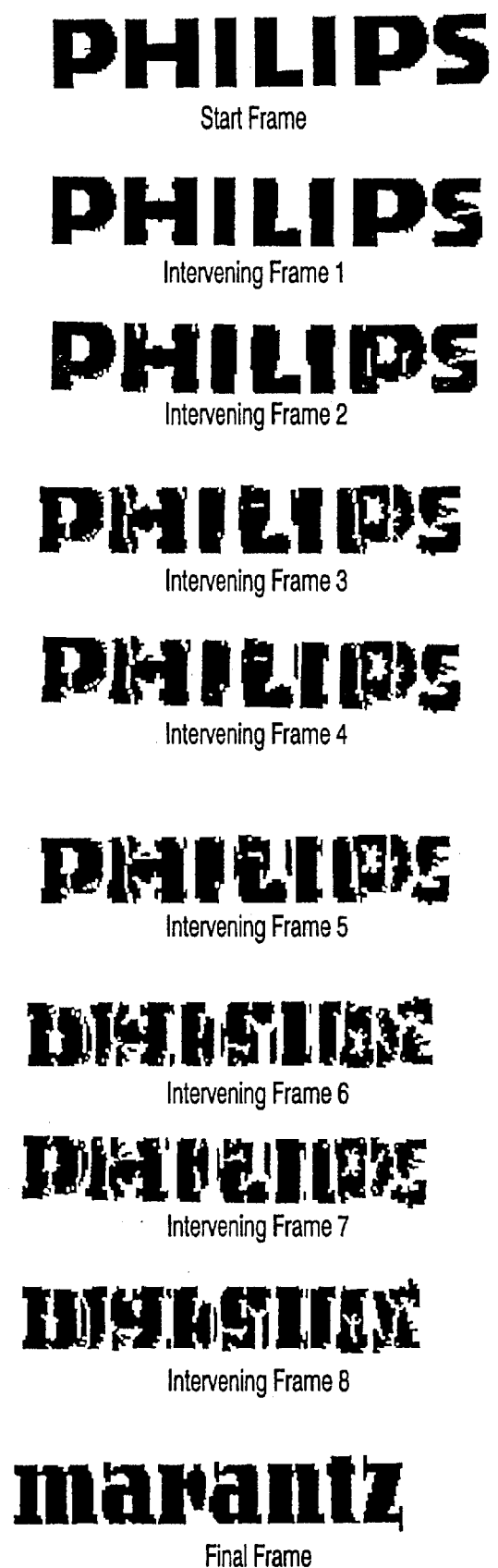
FIG. 11 shows the series of intermediate images between the first and second image when morphing between the first and second images.

1) Two lists are created, the first being the positions of the black pixels in PHILIPS and the second being the positions of the black pixels in MARANTZ. These are referred to as the start and end lists.
2) Each pixel in the start list is mapped to its closest partner in the end list. Then each remaining pixel in the end list is mapped to its closest partner in the start list.
3) The distance from each pixel in the end list to a particular pixel in the start list is determined by means of Pythagoras' Theorem. That is x and y positions in the array are determined for the pixels in the start and end lists and the straight line distance between these pixels is calculated using the formula distance $l=\sqrt{dx^2+dy^2}$.
4) The intervening positions are calculated by dividing the distance determined in step 3 by the number of intervening frames to calculate the distance moved by a particular pixel between each frame. This is transformed into x and y co-ordinates so that a list of pixels for each frame containing the new pixel positions is generated.
5) Each list created in step 4 is converted back to a new bit map image. This involves creating a white bit map of the required size and converting those pixels at positions contained within the list to black. This results in a sequence as shown in FIG. 11.
6) Using the same process as described with respect to animation the bit map for each of the frames is converted into an array of DRCs and these characters are stored in the ROM 10.
7) Each bit map recreated in the RAM 16 from the DRCs copied from the ROM 10 to the RAM 16 is then displayed in turn to produce the morphing effect.

Figure 10A:
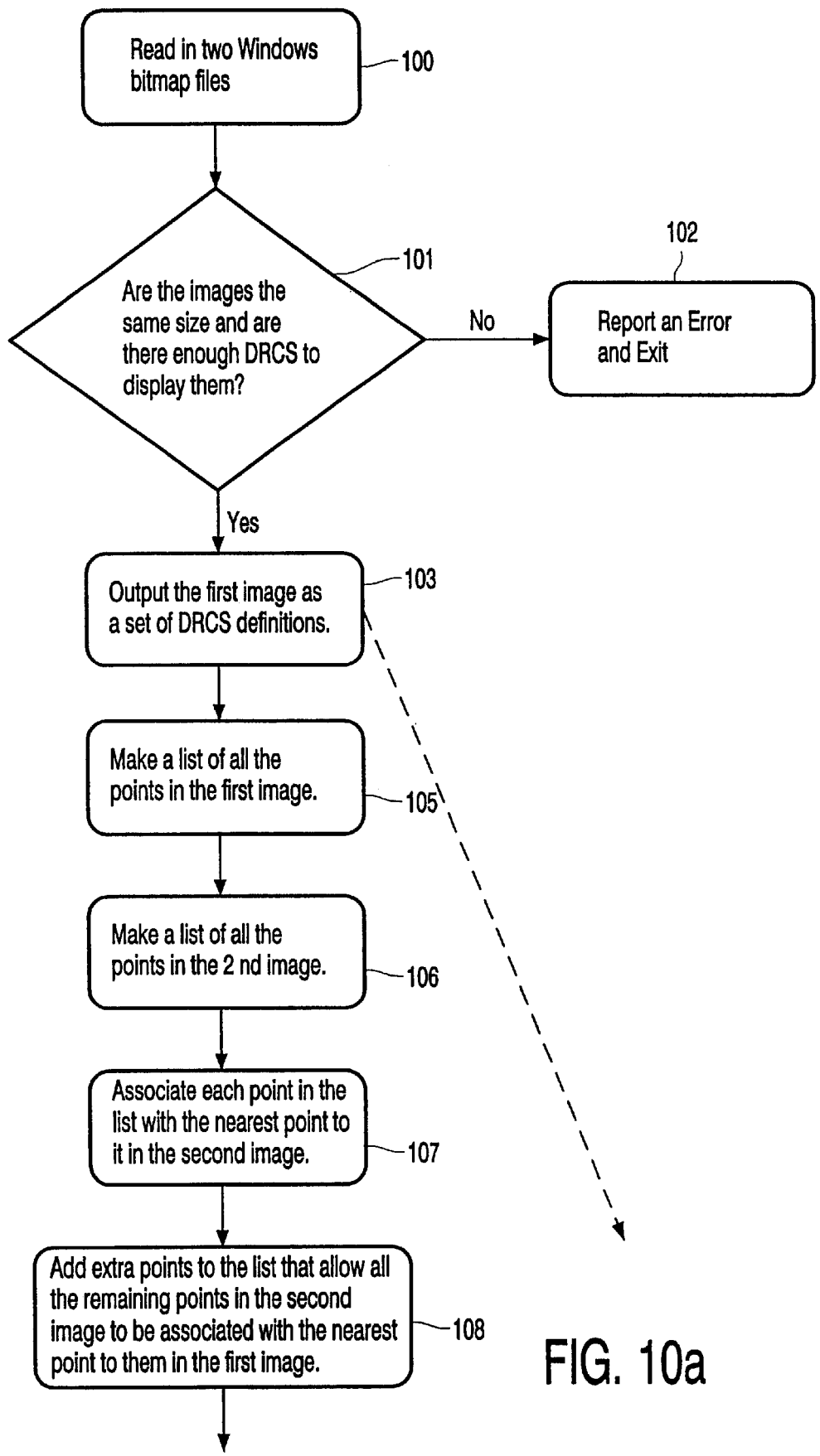
FIGS. 10a and 10b are flow diagrams illustrating the process for generating the required images for morphing between a first and second image.
Figure 10B:
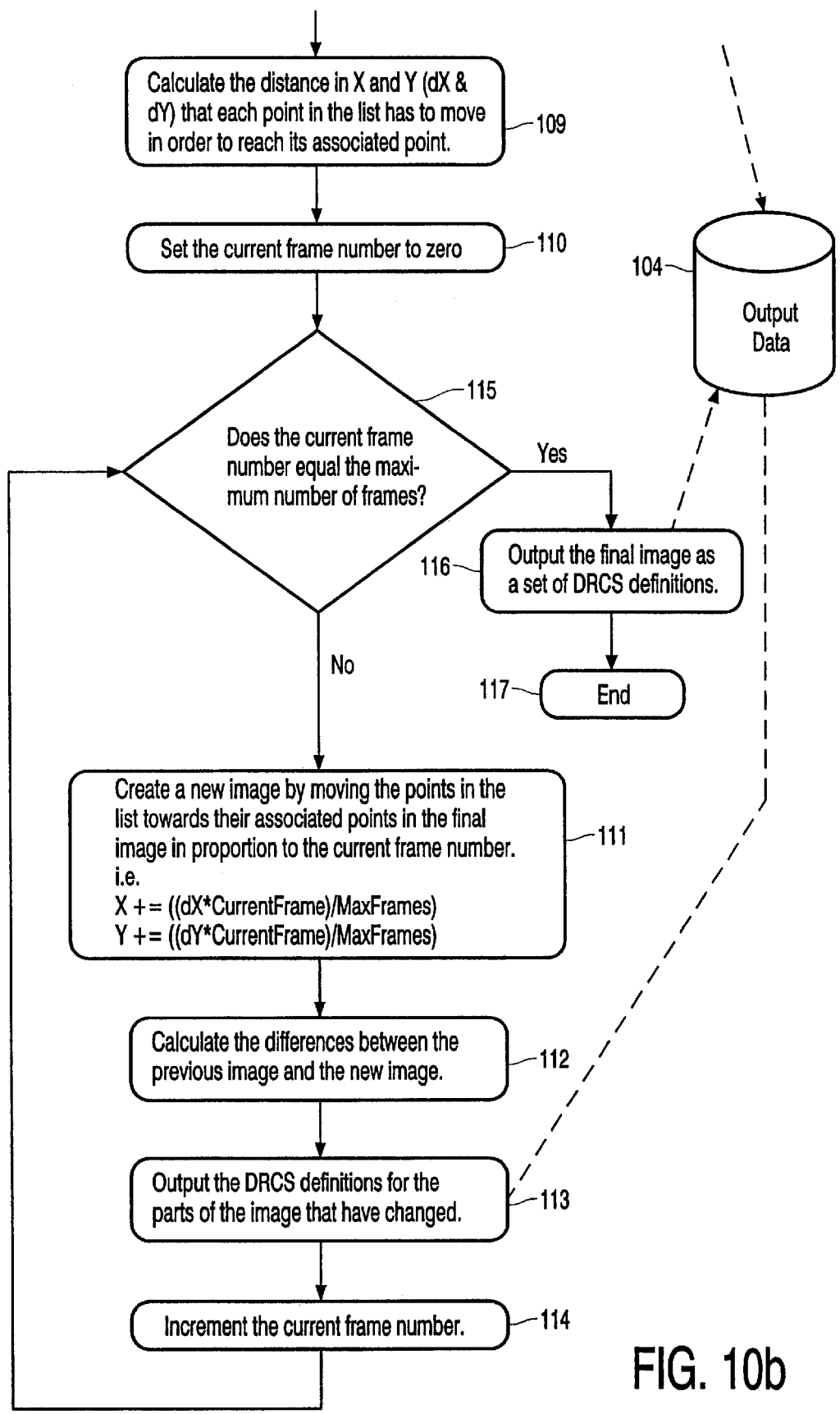

FIGS. 10a and 10b are flow diagrams illustrating the process of generating the data for storage in the ROM 10 to allow the morphing process to be achieved. The data is generated using a personal computer or workstation to generate data files to be written into the ROM 10 during manufacture.

The process starts, at block 100, by reading two bitmap files representing the first and final images. A check, block 101, is then made as to whether the images are the same size and whether they fit within an available array of DRCs. If not, an error is reported and the process ends, block 102. Assuming that the conditions are met then the first image is resolved into a set of DRC definitions, block 103, and output to a data file 104. A first list of all the black pixels in the first image is then compiled, block 105. A second list of all the black pixels in the second image is then compiled, block 106. Each black pixel in the first list is associated with the nearest black pixel in the second list. block 107. Each remaining black pixel in the second list is associated with the nearest black pixel in the first list, block 108. The distance (dX and dY) in X and Y directions that each black pixel has to move in order to reach its associated pixel is calculated, block 109. The current frame number is set to one, block 110. A new image is now created by moving black pixels in the first list towards their associated pixels in the second list in proportion to the current frame number, block 111. Thus $$X_n = X_f + dx\frac{\text{current frame No}}{\text{Total frames}}$$

$$Y_n = Y_f + dy\frac{\text{current frame No}}{\text{Total frame}}$$

where $X_n$ is pixel X position in current frame
  $X_f$ is pixel X position in first frame
  $d_x$ is pixel movement in X direction between first and final frames
and $Y_n$ is pixel Y position in current frame
  $Y_f$ is pixel Y position in first frame
  $d_y$ is pixel movement in Y direction between first and final frames.

The differences between the previous image and the new image are calculated, block 112. New DRC definitions for the parts of the image which have changed are generated, block 113, and output to the data file 104. The current frame number is then incremented, block 114, and a decision is made, block 115 as to whether the current frame number is equal to the maximum number of frames. If not, then block 111 is reentered and the rest of the process is repeated. If the current frame is equal to the maximum number of frames a set of DRCs corresponding to the final image is generated, block 116, and output to the data file 104 and the process then ends, block 117. The output data file as a result contains DRCs representing each of the images or at least those parts of each image which have changed from the preceding image. This data is then stored in the ROM 10 during manufacture.

Figure 12A:
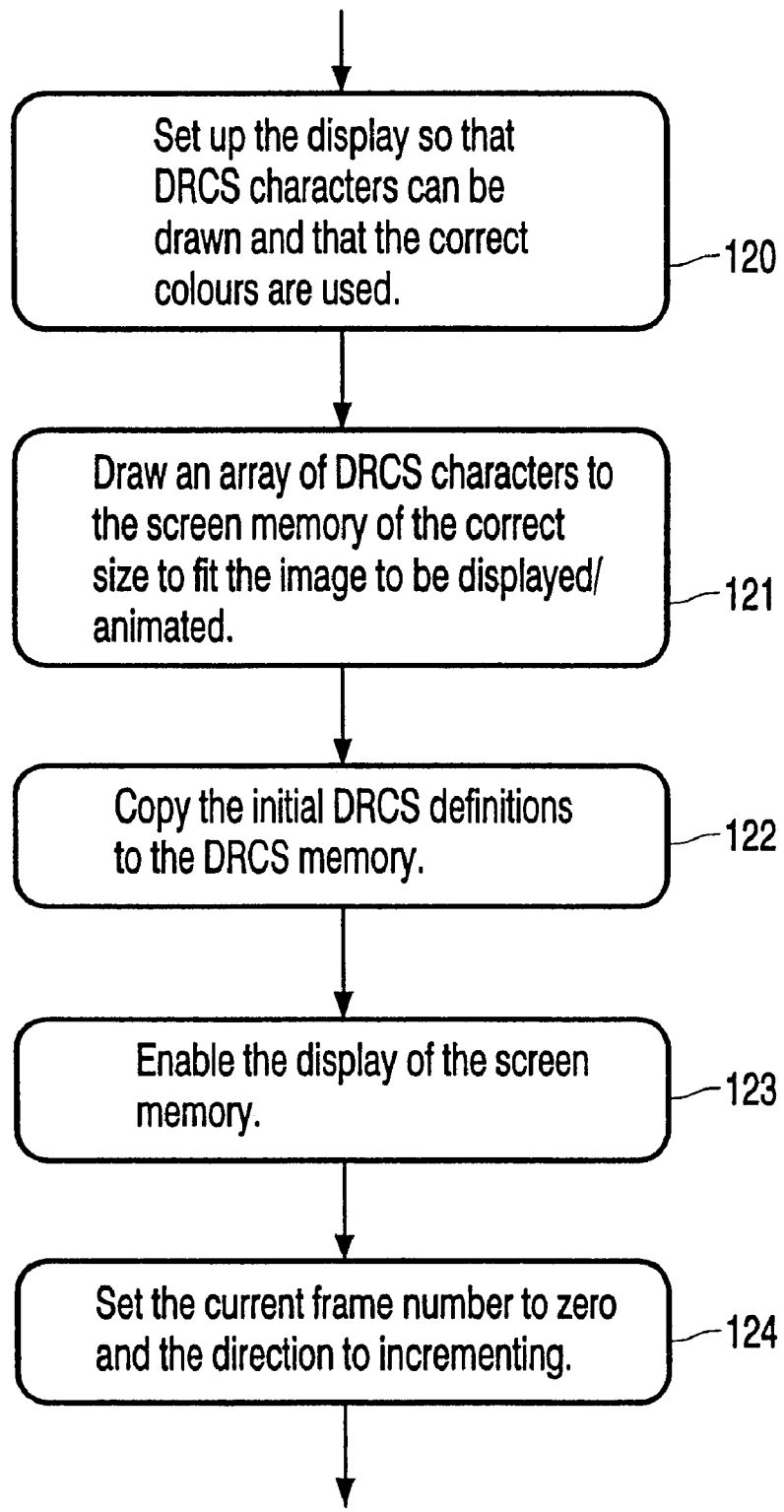
FIGS. 12a and 12b are flow diagrams illustrating the process of displaying the successive images using the dynamically redefinable characters stored in the non volatile memory.
Figure 12B:
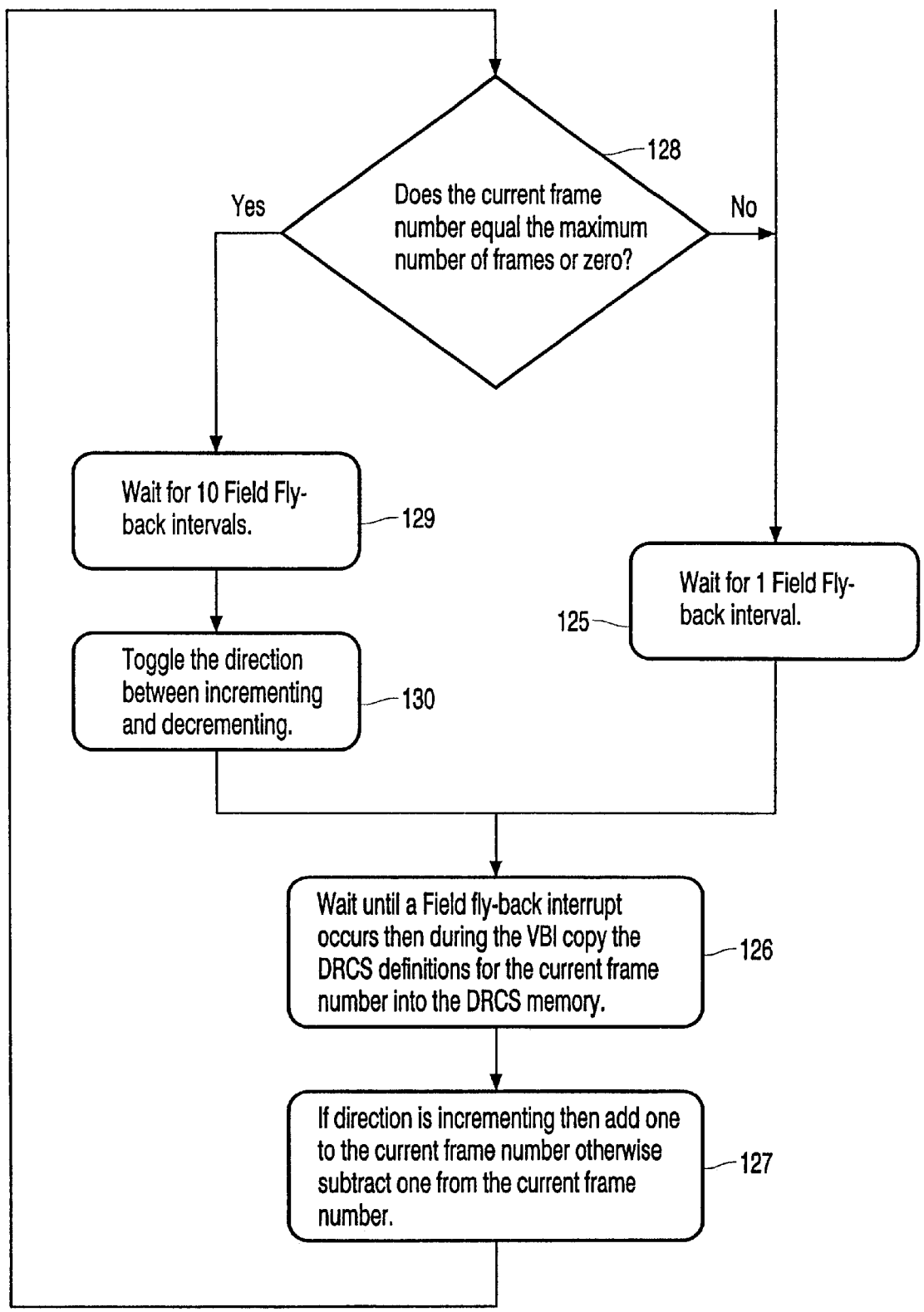

FIGS. 12a and 12b are flow diagrams illustrating the method by which the sequence of images stored as DRCs in the ROM 10 are reproduced on the screen to provide animation or morphing.

The first step in the display process is to set up the display so that DRCs can be drawn and that the correct colours are used, block 120. It will be apparent that, although in the preceding description black pixels were referred to, the pixels of the character can be any desired colour but that a single colour is used for the moving image on a different background colour. The next step, block 121, is to draw an array of DRCs to the display memory having the correct size to fit the image to be displayed. The next step, block 122, is to copy the initial DRC definitions to the appropriate positions in the array. The display memory is then enabled, block 123, so that its contents can be displayed on the display screen at the appropriate time. The current frame number is then set to zero and the direction to incrementing, block 124. The next step, block 125, is to wait for one field flyback interval and then, block 126, to wait until a field fly back interrupt occurs and copy the DRC definitions for the current frame from the ROM 10 to the DRC memory 16 during the vertical blanking interval. This ensures that the image is not changed during the scanning period. The next step is to add one to the current frame number if the direction is incrementing or to subtract one from the current frame number if the direction is decrementing, block 127. A decision, block 128, is then taken as to whether the current frame number equals maximum number of frames or zero. If not, then the process is re-entered at block 125. If the current frame number is equal to zero or the maximum number of frames then the process waits for a number of field flyback intervals, for example ten, as illustrated by block 129 and then toggles the direction between incrementing and decrementing, block 130. The process is then re-entered at block 126.

It will be apparent that the process described with reference to FIGS. 12*a* and 12*b* is that used for morphing between two images the process being periodically reversed, i.e. from PHILIPS to MARANTZ and then back to PHILIPS, etc. This process can, of course, be initiated and terminated by control instructions from the microprocessor 6. The same process may be used for the animation shown in FIGS. 4 to 8, in which case the orbiting sphere would periodically reverse directions. Alternatively the process could be modified by looping from the final image back to the first image instead of changing directions and for a repetitive motion this may be more appropriate. Additionally, if an animated sequence or morphing is to be displayed once only, the process will be exited once the current frame reaches the maximum number.

Clearly it is possible to modify the method and television receiver described in the embodiments without departing from the scope of the invention. The number of DRCs in the array may be greater or less than thirty two and the DRCs may be made up from a greater or lesser number of pixels. The size of the DRC bit maps specified in the examples are chosen to conform to the sizes of teletext characters and while this is clearly convenient it is not essential, particularly as it is not essential that the television receiver includes a data capture circuit as teletext transmissions are not receivable in all countries and consequently in that case there is no benefit in conforming to the standards used in teletext services. Although the sequence of images stored as DRCs are stated to be stored in a ROM 10 this memory could be replaced by any form of non-volatile memory including one which can be re-programmed. That would enable new images to be written into the non-volatile memory instead of or in addition to those initially present. Such new images could be transmitted by a broadcaster in an associated data channel, such as a teletext broadcast. Alternatively the non-volatile memory could be updated using any other data transfer method or by replacing at least the part of the memory containing the DRCs.

In addition although the method has been described with reference to the display of images in a television receiver it could equally be applied to the display of images in other products, for example portable games machines, which are arranged to display pictures and in this case the display device will form part of that other product. It will be clear from the foregoing description that the primary application of the present invention is in low cost consumer products where relatively low capability (and hence low cost) microprocessors and relatively small memories are provided. There is, of course, no reason why the invention could not be used with more powerful processor and where more memory is available but the reasons for using the present invention in such a context are not as compelling as is the case where the memory and processing power are more limited.

From reading the present disclosure, other modifications will be apparent to persons skilled in the art. Such modifications may involve other features which are already known in the design and use of image display methods and apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A method of producing a series of images for display on a display device using a microprocessor having a non-volatile memory and a display RAM comprising the steps of:

a) providing each image in the form of a bit map, b) resolving each of the bit mapped images into an n×m array of dynamically redefinable characters (DRC) of a×b pixels, where a, b, m, and n are integers, c) storing each of the DRCs forming each of the images in the non volatile memory, d) copying under the control of the microprocessor the array of DRCs for each image in turn from the non volatile memory into a display RAM to create a bit mapped image, and e) displaying in turn each of the bit mapped images.

2. A method as claimed in claim 1 in which DRCs that are unchanged between successive images are stored only once in the non-volatile memory.

3. A method as claimed in claim 1 or claim 2 in which m×n is not greater than thirty two.

4. The method as claimed in claim 1 in which a first image is transformed to a second image by gradually distorting the first image so as to move chosen points on the first image to the position of corresponding points on the second image.

5. A method as claimed in claim 4 comprising the steps of:

f) creating a first list of positions of pixels of a given colour in the first image, g) creating a second list of positions of pixels of the given colour in the second image, h) mapping each pixel in the first list to its closest partner in the second list, i) mapping each remaining pixel in the second list to its closest partner in the first list, j) calculating the position of each pixel in intermediate images between the first and second images to create intermediate lists of positions of pixels, k) converting each of the lists created in step j) into a bitmap image, l) resolving each of the images produced in step k) into an array of DRCs, m) storing the DRCs of each image in the non-volatile memory, and n) carrying out steps d) and e).

6. A method as claimed in claim 5 in which steps c) and d) of claim are carried out using Pythagoras' theorem to calculate the positions in x and y directions.

7. A method as claimed in claim 6 in which step e) of claim 5 is carried out by dividing the change in x and y directions by the number of intervening images to produce intermediate positions for each pixel.

8. A method as claimed in claim 1, in which the display device is the display device of a television receiver.

9. A display device comprising a microprocessor having a non-volatile memory associated therewith, a display arrangement for displaying on screen display text and/or graphics generated by said microprocessor, said display arrangement including a memory for storing a standard set or sets of characters, a portion of memory for storing dynamically redefinable characters (DRCs), and means for displaying selected characters from said standard set or sets or from said DRCs, wherein the non-volatile memory contains a series of images each of which is resolved into an array of DRCs, and the microprocessor is arranged to transfer each of the images in turn into said portion of memory in the display arrangement in order to display a selected sequence of images.

10. A display device as claimed in claim 9 in which the non-volatile memory is a read only memory.

11. A display device as claimed in claim 9 or claim 10 in which the sequence of images results on display in morphing of a first image to a second image.

12. A display device as claimed in claim 9 or claim 10 in which the sequence of images results in an animated display.

13. The display device as claimed in claim 9 wherein the display device is a television receiver.

14. The television receiver as claimed in claim 13 in which the DRCs are modified by data received over a data channel.

15. The television receiver as claimed in claim 14 in which the data channel is a teletext channel.

* * * * *